United States Patent
Aoki et al.

(10) Patent No.: US 11,174,896 B2
(45) Date of Patent: Nov. 16, 2021

(54) MOTION GUIDING DEVICE AND TRANSPORT DEVICE

(71) Applicant: THK CO., LTD., Tokyo (JP)

(72) Inventors: Shinji Aoki, Tokyo (JP); Takeshi Shimamura, Tokyo (JP)

(73) Assignee: THK CO., LTD., Tokyo (JP)

( * ) Notice: Subject to any disclaimer, the term of this patent is extended or adjusted under 35 U.S.C. 154(b) by 384 days.

(21) Appl. No.: 16/338,911

(22) PCT Filed: Oct. 25, 2017

(86) PCT No.: PCT/JP2017/038480
§ 371 (c)(1),
(2) Date: Apr. 2, 2019

(87) PCT Pub. No.: WO2018/079588
PCT Pub. Date: May 3, 2018

(65) Prior Publication Data
US 2019/0232977 A1    Aug. 1, 2019

(30) Foreign Application Priority Data
Oct. 25, 2016   (JP) .............................. JP2016-208692

(51) Int. Cl.
*F16C 29/04*   (2006.01)
*B61B 13/04*   (2006.01)
*B61C 3/00*    (2006.01)

(52) U.S. Cl.
CPC .............. *F16C 29/04* (2013.01); *B61B 13/04* (2013.01); *B61C 3/00* (2013.01)

(58) Field of Classification Search
CPC ........ B61B 13/04; F16C 29/005; F16C 29/04; F16C 29/045; B61C 3/00; H02K 7/08; H02K 41/031
See application file for complete search history.

(56) References Cited

U.S. PATENT DOCUMENTS

| 5,231,932 A | * | 8/1993 | Enderlein | ............ B65G 19/025 104/162 |
| 2008/0257199 A1 | * | 10/2008 | Jackson | .................. B61B 13/04 105/144 |

FOREIGN PATENT DOCUMENTS

| CN | 105473880 A | 4/2016 |
| CN | 105744859 A | 7/2016 |

(Continued)

OTHER PUBLICATIONS

International Search Report dated Jan. 23, 2018, issued in counterpart International Application No. PCT/JP2017/038480, w/English translation (4 pages).

(Continued)

*Primary Examiner* — Zachary L Kuhfuss
(74) *Attorney, Agent, or Firm* — Westerman, Hattori, Daniels & Adrian, LLP

(57) ABSTRACT

In a motion guiding device including a track body, and a moving body provided to be movable along the track body, the track body includes a groove formed along a longitudinal direction of the track body and a plurality of rolling surfaces formed inside and outside the groove. The moving body includes a plurality of rotating bodies that roll on the plurality of rolling surfaces, and adopts a configuration in which respective contacts in which the plurality of rotating bodies are in contact with the plurality of rolling surfaces are disposed on the same straight-line in a cross-section orthogonal to the longitudinal direction of the track body.

6 Claims, 9 Drawing Sheets

(56) References Cited

FOREIGN PATENT DOCUMENTS

| | | | |
|---|---|---|---|
| CN | 105987081 | A | 10/2016 |
| JP | 48-78601 | A | 10/1973 |
| JP | 58-26775 | U | 2/1983 |
| JP | 63-74519 | U | 5/1988 |
| JP | 63-168322 | U | 11/1988 |
| JP | 2003-267281 | A | 9/2003 |
| WO | 2015/052047 | A1 | 4/2015 |

OTHER PUBLICATIONS

Office Action dated Mar. 16, 2020, issued in counterpart CN Application No. 201780065002.0, with Partial translation.

* cited by examiner

MOTION GUIDING DEVICE AND TRANSPORT DEVICE

TECHNICAL FIELD

The present invention relates to a motion guiding device and a transport device.

This application claims priority based on Japanese Patent Application No. 2016-208692 filed in Japan on Oct. 25, 2016, the entire content of which is incorporated herein by reference.

BACKGROUND ART

As an example of a motion guiding device including a track body and a moving body provided to be movable along the track body, an axial motion bearing having a longitudinal axis and a bearing moving along the longitudinal axis is disclosed in Patent Document 1.

This axial motion bearing has a configuration in which a bearing (moving body) is mounted on a longitudinal axis (track body) made of a trajectory surface (rolling surface) of a V guide, and a ball bearing (rotating body) mounted on the bearing is incorporated by being brought into contact with the trajectory surface.

CITATION LIST

Patent Literature

[Patent Literature 1]
Japanese Unexamined Utility Model Application, First Publication No. S63-168322

SUMMARY OF INVENTION

Technical Problem

The motion guiding device of the related art described above has a configuration in which a rotating body is in contact with the top and side surfaces of a track body and rolls. According to this configuration, the moving body can be linearly moved along the track body, but, when this track body includes a curve portion, it is difficult to move the moving body along the curve portion. This is because path lengths are different between an inner circumferential side trajectory of the rotating body which is in contact with the top surface of the track body and an outer circumferential side trajectory of the rotating body which is in contact with the side surface of the track body in the curve portion, and thus occurrence of backlash and overloading may occur. In such a case, it is necessary to add a rotation mechanism or the like for adjusting a position of the rotating body, but there are then problems that the number of parts increases and the running sound increases.

The present invention provides a motion guiding device and a transport device which can achieve a smooth operation and a decreased running sound of the moving body with a simple configuration even when a track body includes a curve portion.

Solution to Problem

According to a first aspect of the present invention, a motion guiding device includes a track body, and a moving body provided to be movable along the track body. The track body includes a groove formed along a longitudinal direction of the track body and a plurality of rolling surfaces formed inside and outside the groove. The moving body has a plurality of rotating bodies that roll on the plurality of rolling surfaces. Respective contacts in which the plurality of rotating bodies are in contact with the plurality of rolling surfaces are disposed on the same straight-line in a cross-section orthogonal to the longitudinal direction of the track body.

According to a second aspect of the present invention, at least one of the plurality of rolling surfaces may be an inclined surface inclined with respect to the straight-line on which the contacts are arranged. A circumferential surface of the rotating body in contact with the inclined surface may be formed in a circular arc shape.

According to a third aspect of the present invention, a remaining portion of the plurality of rolling surfaces other than the inclined surface may be a plane along the straight-line in which the contacts are arranged.

According to a fourth aspect of the present invention, the plurality of rotating bodies may be provided in plural rows at intervals in a front and back direction of the moving body along the longitudinal direction of the track body.

According to a fifth aspect of the present invention, the track body may have a curve portion curved in a direction orthogonal to the straight-line on which the contacts are arranged.

According to a sixth aspect of the present invention, a transport device includes a motion guiding device having a track body, a moving body provided to be movable along the track body and a drive device causing the moving body to move along the track body. This transport device may include the motion guiding device described in any one of the aspects 1 to 5 of the present invention as the motion guiding device.

Advantageous Effects of Invention

According to the motion guiding device and the transport device described above, curve portion is possible to achieve a smooth operation and a decreased running sound of a moving body with a simple configuration even when a track body includes a curve portion.

DESCRIPTION OF EMBODIMENTS

Hereinafter, the embodiments of the present invention will be described with reference to drawings. The embodiments shown in the following description are intended to be described by way of citing examples, in order to allow better understanding of the gist of the invention, and unless particularly specified otherwise, these are not intended to limit the present invention. Further, in drawings used in the following description, in order to clarify the features of the present invention, for convenience, main parts may have been enlarged, and size ratios between respective components may not necessarily the same as actual ones. Further, in order to clarify the features of the present invention, for convenience, portions may have been omitted.

First Embodiment

Figure 1:
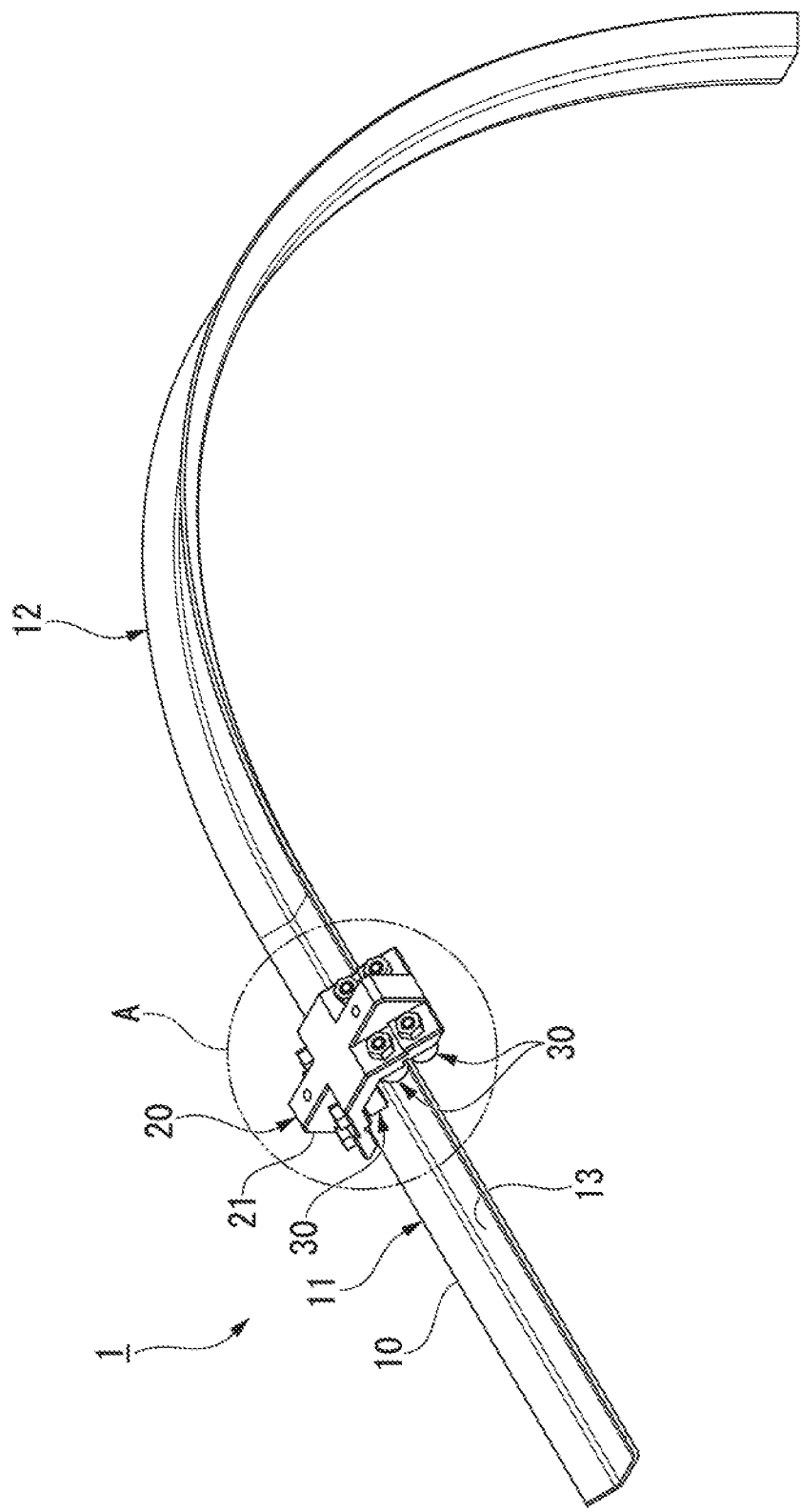
FIG. 1 is a perspective view which shows a motion guiding device in a first embodiment of the present invention.

FIG. 1 is a perspective view which shows a motion guiding device 1 in a first embodiment of the present invention.

The motion guiding device 1 has a track body 10 and a moving body 20 moving along the track body 10 as shown in FIG. 1. The track body 10 has a linear portion 11 extending in a straight-line shape and a curve portion 12 connected to the linear portion 11 and curved with a predetermined curvature. The moving body 20 is a straight-to-curve guide which moves between the linear portion 11 and the curve portion 12. The moving body 20 has a plurality of rotating bodies 30 that roll on a surface of the track body 10.

Figure 2:
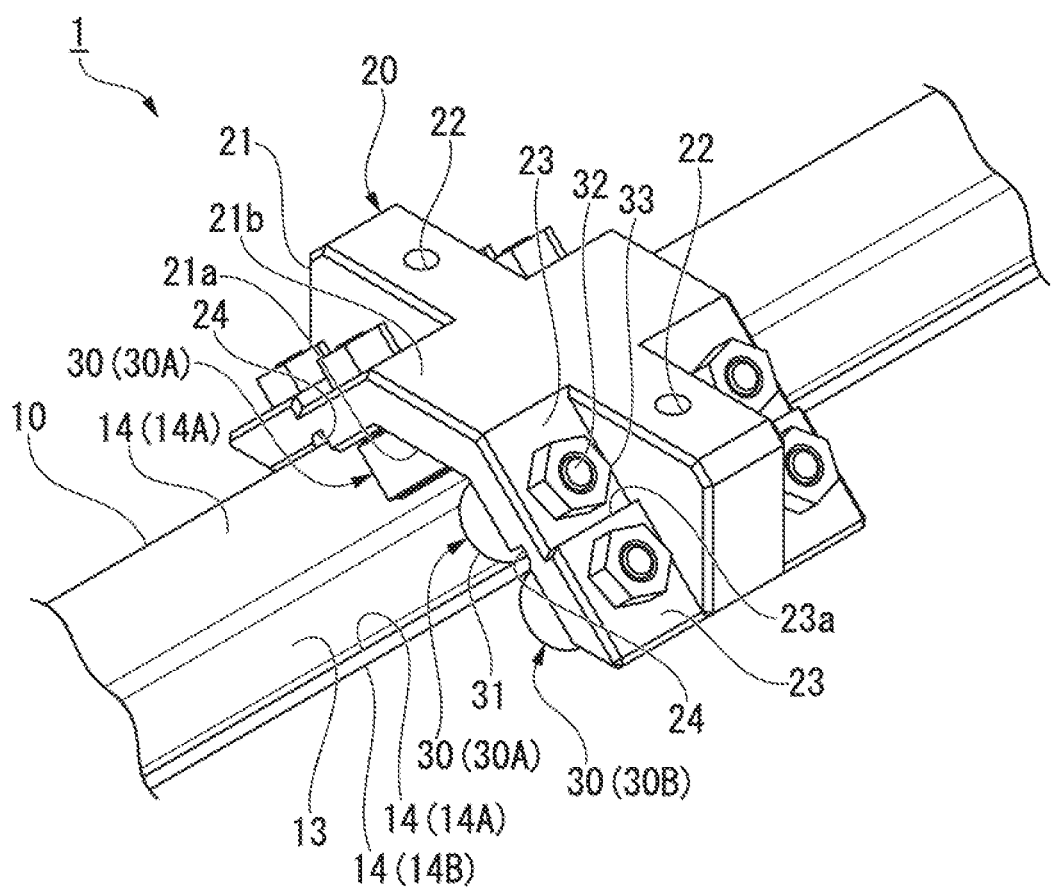
FIG. 2 is an enlarged perspective view of an area A shown in FIG. 1.
Figure 3:
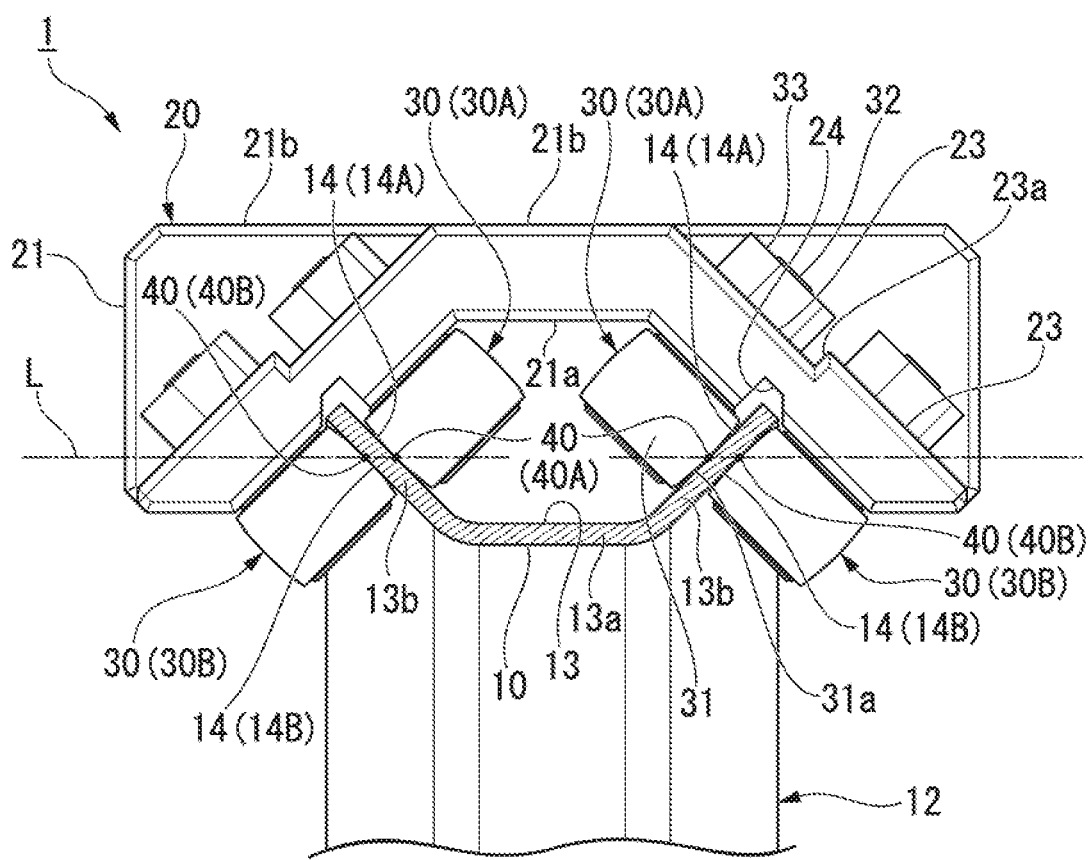
FIG. 3 is a front view of a moving body including a cross-section orthogonal to a longitudinal direction of a track body in the first embodiment of the present invention.
Figure 4:
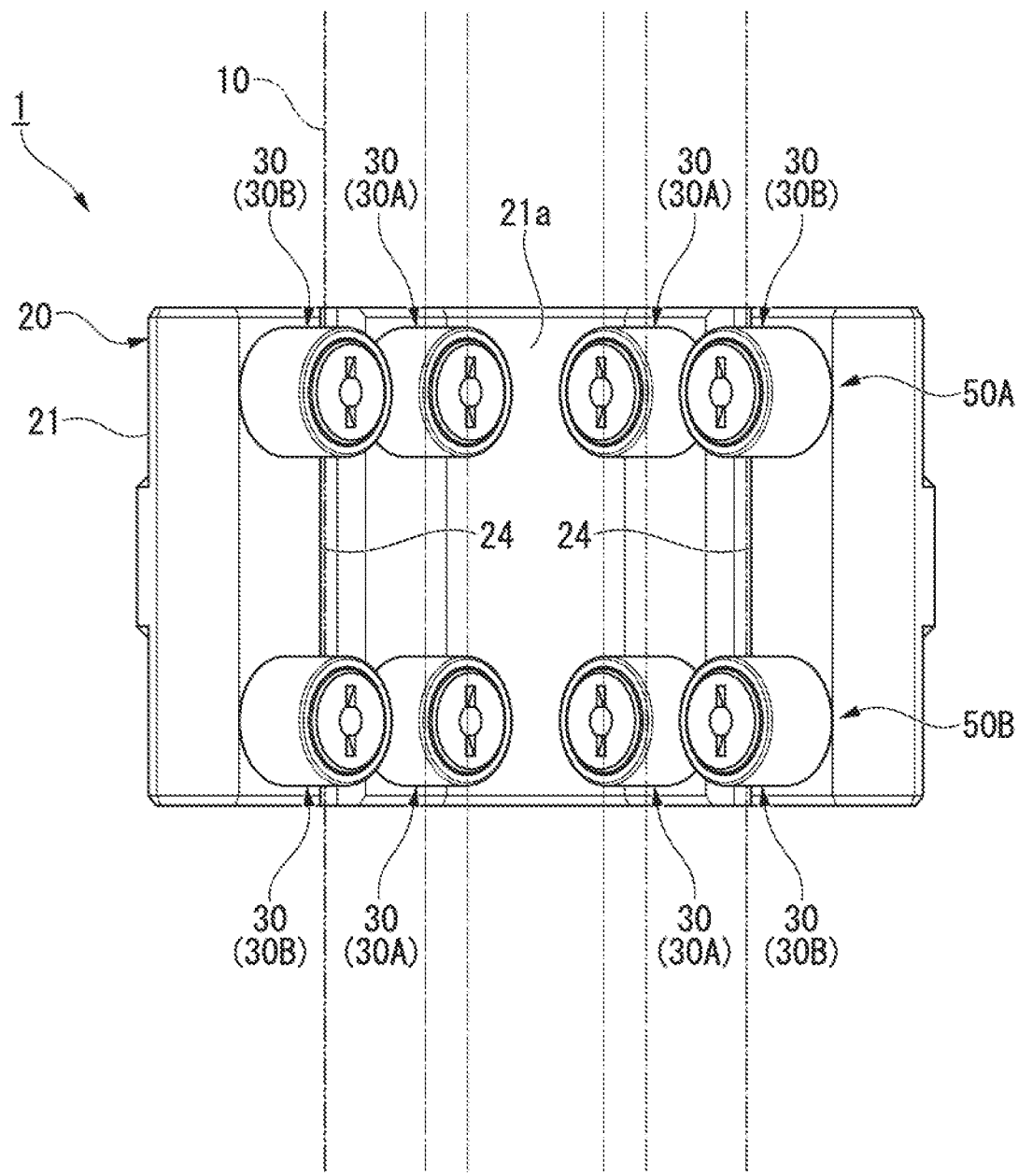
FIG. 4 is a bottom view of the moving body in the first embodiment of the present invention.

FIG. 2 is an enlarged perspective view of an area A shown in FIG. 1. FIG. 3 is a front view of the moving body 20 including a cross-section orthogonal to a longitudinal direction of the track body 10 in the first embodiment of the present invention. FIG. 4 is a bottom view of the moving body 20 in the first embodiment of the present invention.

As shown in FIG. 2, the track body 10 has a groove 13 formed in a longitudinal direction of the track body 10, and a plurality of rolling surfaces 14 (an inner rolling surface 14A and an outer rolling surface 14B) formed inside and outside so as to have the groove 13 interposed therebetween.

The track body 10 has a substantially plate-like shape having a predetermined thickness as shown in FIG. 3. The groove 13 is formed in a central portion of the track body 10 in the width direction (the lateral direction of a page in FIG. 3). The groove 13 has a trapezoidal shape in which the upper base is larger than the lower base, and is formed in an isosceles trapezoidal shape in which the base angles of the left and right legs with respect to the lower base are equal to each other in a cross-section shown in FIG. 3. A bottom portion 13a of the groove 13 is formed in a planar shape. A pair of side-wall portions 13b that are inclined in directions in which they separate from each other as going upwards are provided at both side edges of this bottom portion 13a.

An inner rolling surface 14A is formed on an inner wall surface of each of the pair of side-wall portions 13b. In addition, an outer rolling surface 14B is formed on an outer wall surface of each of the pair of side-wall portions 13b.

In other words, a total of four rolling surfaces 14 including two inner rolling surfaces 14A inside the groove 13 and two outer rolling surfaces 14B outside the groove 13, are formed in the track body 10 of the present embodiment with the groove 132 interposed therebetween. The inner rolling surface 14A and the outer rolling surface 14B formed on the front and rear surfaces of the side-wall portion 13b are parallel to each other, and are inclined surfaces inclined with respect to the bottom portion 13a.

The moving body 20, as shown in FIG. 2, has a moving block 21, and the plurality of rotating bodies 30 supported to be rotatable on an inner surface 21a side of the moving block 21. A mounting hole 22 is formed in a flat portion of an outer surface 21b of the moving block 21. A guiding object of the motion guiding device 1 is attached to the mounting hole 22. Note that a guiding object may be a cover or the like which covers an outer side of the moving block 21.

In addition, a mounting surface 23 of the rotating body 30 is formed on the outer surface 21b of the moving block 21. The mounting surface 23 is formed to be inclined diagonally downward with respect to the flat portion of the outer surface 21b as shown in FIG. 3. A through hole (not shown) communicating with the inner surface 21a side of the moving block 21 is formed on the mounting surface 23. A rotation shaft 32 of the rotating body 30 is inserted into this through hole. The rotation shaft 32 is fastened and fixed to the moving block 21 by a nut 33 being screwed into an end projecting to the mounting surface 23 side.

The rotation shaft 32 supports a roller unit 31 of the rotating body 30 on the inner surface 21a side of the moving block 21. The roller unit 31 rotates about the rotation shaft 32. A circumferential surface 31a of the roller unit 31 is in contact with the rolling surface 14 formed in the track body 10. For the rotating body 30, for example, a cam follower or the like which incorporates a needle bearing or the like between the roller unit 31 and the rotation shaft 32 can be appropriately adopted.

Four rotating bodies 30 are provided corresponding to the four rolling surfaces 14. Note that the rotating body 30 which rolls on the inner rolling surface 14A is referred to as a first rotating body 30A. In addition, the rotating body 30 which rolls on the outer rolling surface 14B is referred to as a second rotating body 30B.

As shown in FIG. 3, respective contacts 40 in which the plurality of rotating bodies 30 are in contact with the plurality of rolling surfaces 14 are disposed on the same straight-line L in a cross-section orthogonal to the longitudinal direction of the track body 10.

This straight-line L is a straight-line extending in the width direction of the track body 10.

Specifically, a first contact 40A between the first rotating body 30A and the inner rolling surface 14A which are in contact with each other inside the groove 13, and a second contact 40B between the second rotating body 30B and the outer rolling surface 14B which are in contact with each other outside the groove 13 are disposed on the same straight-line L. The first rotating body 30A and the second rotating body 30B have a positional relationship in which they do not face each other across the side-wall portion 13b (the track body 10) such that the first contact 40A and the second contact 40B are disposed on the same straight-line L.

In the present embodiment, the plurality of rotating bodies 30 have the same configuration, and the first rotating body 30A and the second rotating body 30B have a positional relationship that they do not face each other across the side-wall portion 13b by forming a step 23a to the mounting surface 23 of the moving block 21. Note that, if the rotating body 30 having a different length of the rotation shaft 32 is used, the step 23a may not have to be formed on the mounting surface 23. In addition, an escape groove 24 for avoiding contact with the tip of the side-wall portion 13b is formed on the inner surface 21a of the moving block 21.

At least one (all in the present embodiment) of the plurality of rolling surfaces 14 is, as shown in FIG. 3, an inclined surface inclined with respect to a straight-line L in which the contacts 40 are arranged. The circumferential surface 31a of the rotating body 30 (all in the present embodiment) in contact with this inclined surface is formed in a circular arc shape. Specifically, a cross-section contour shape of the circumferential surface 31a of a cross-section along a rotational center of the roller unit 31 is formed in a circular arc shape. That is, the first rotating body 30A is in contact with the inner rolling surface 14A at a single point, and the second rotating body 30B is also in contact with the outer rolling surface 14B at a single point.

As shown in FIG. 4, the four rotating bodies 30 described above are provided in plural rows (two rows in the present embodiment) at intervals in a front and back direction of the moving body 20 along the longitudinal direction of the track body 10. That is, each of rotating body groups 50A and 50B made of four rotating bodies 30 (two each of the first rotating body 30A and the second rotating body 30B) in which the contacts 40 are arranged on the straight-line L shown in FIG. 3 are disposed at the front and back of the moving body 20, respectively. A distance between the rotating body groups 50A and 50B affects a range of curvature of the curve portion 12 of the track body 10 that can be coped with, and thus is preferred to be shorter.

Subsequently, an operation of the motion guiding device 1 of the configuration described above will be described.

Figure 5:
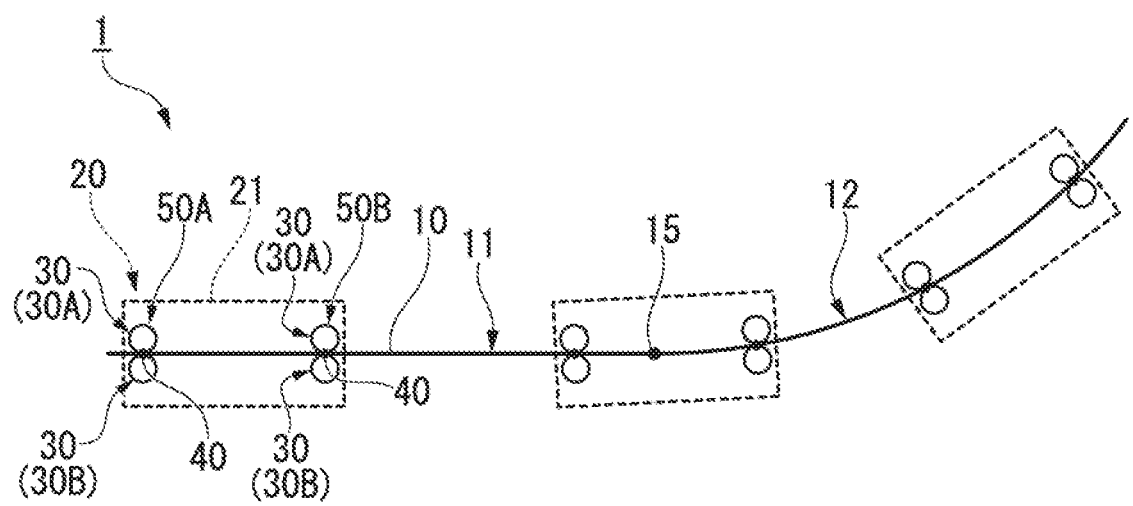
FIG. 5 is a schematic diagram for describing an operation of the motion guiding device in the first embodiment of the present invention.

FIG. 5 is a schematic diagram for describing an operation of the motion guiding device 1 in the first embodiment of the present invention.

As shown in FIG. 5, the moving body 20 moves along the track body 10. The track body 10 has the linear portion 11 and the curve portion 12, and the moving body 20 moves between the linear portion 11 and the curve portion 12. There is a connection point 15 between the linear portion 11 and the curve portion 12.

Here, the track body 10 includes the groove 13 formed along the longitudinal direction of the track body 10 and the plurality of rolling surfaces 14 formed inside and outside the groove 13 as shown in FIG. 3. In addition, the moving body 20 has the plurality of rotating bodies 30 that roll on the plurality of rolling surfaces 14, and the respective contacts 40 in which the plurality of rotating bodies 30 are in contact with the plurality of rolling surfaces 14 are disposed on the same straight-line L in a cross-section orthogonal to the longitudinal direction of the track body 10. Furthermore, the curve portion 12 of the track body 10 is curved in a direction orthogonal to the straight-line L on which the contacts 40 are arranged.

According to this configuration, the moving body 20 transfers from the linear portion 11 to the curve portion 12 without rattling, and it is possible to smoothly move the curve portion 12. That is, as shown in FIG. 3, since the first contact 40A between the first rotating body 30A and the inner rolling surface 14A which are in contact with each other inside the groove 13, and the second contact 40B between the second rotating body 30B and the outer rolling surface 14B which are in contact with each other outside the groove 13 have no inner and outer circumferential difference in the curve portion 12, not only in the linear portion 11 but also in the curve portion 12, path lengths through which the first rotating body 30A and the second rotating body 30B move are the same, and no backlash or excessive preloading occurs. In addition, according to this configuration, since a movable portion such as a rotation mechanism described in the related art described above is capable of being omitted, the number of parts is small and running sound also becomes small.

Figure 6A:
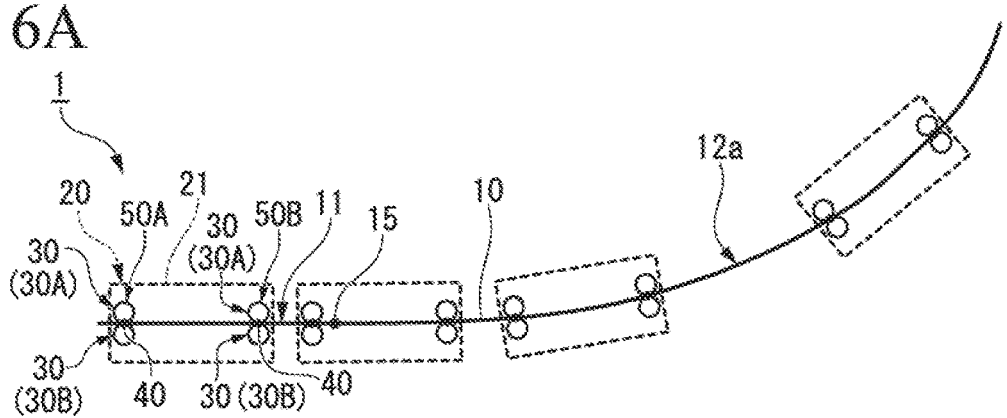
FIG. 6A is a schematic diagram for describing an application example of the motion guiding device in the first embodiment of the present invention.
Figure 6B:
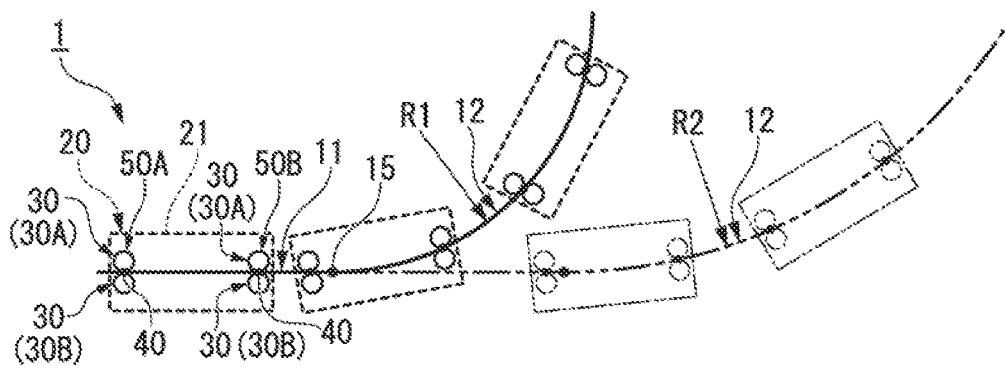
FIG. 6B is a schematic diagram for describing an application example of the motion guiding device in the first embodiment of the present invention.
Figure 6C:
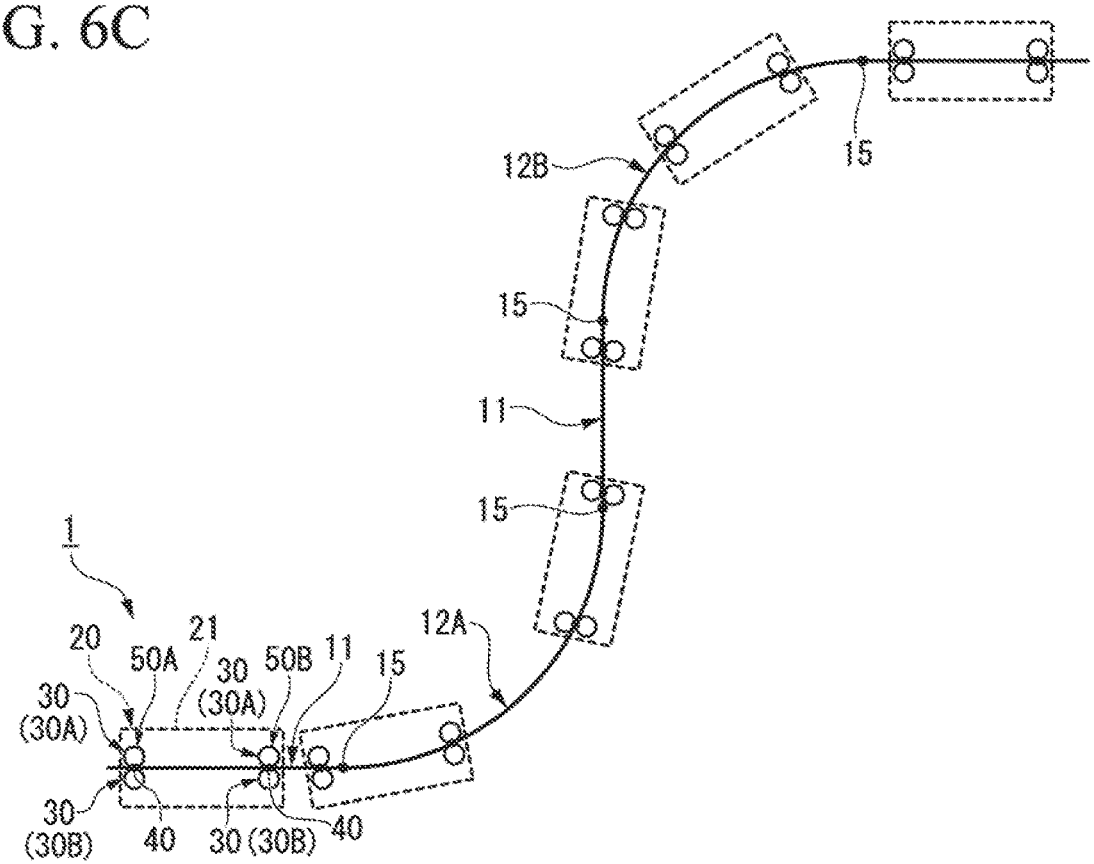
FIG. 6C is a schematic diagram for describing an application example of the motion guiding device in the first embodiment of the present invention.

FIGS. 6A to 6C are schematic diagrams for describing application examples of the motion guiding device 1 in the first embodiment of the present invention.

As described above, in the motion guiding device 1 of the present embodiment, since the respective contacts 40 in which the plurality of rotating bodies 30 are in contact with the plurality of rolling surfaces 14 are disposed on the same straight-line L in a cross-section orthogonal to the longitudinal direction of the track body 10, as shown in FIG. 6A, the moving body 20 can smoothly move even in the curve portion 12a whose curvature changes like a Clothoid curve. Moreover, as shown in FIG. 6B, the moving body 20 can smoothly move even when a curvature radius of the curve portion 12 is different between R1 and R2. That is, it is possible to cope with the curve portion 13 of a certain range using the same moving body 20. Furthermore, as shown in FIG. 6C, even when there is a second curve portion 12B which curves in a direction opposite to that of the first curve portion 12A, the moving body 20 can move smoothly.

In addition, in the present embodiment, as shown in FIG. 3, the plurality of rolling surfaces 14 are inclined surfaces inclined with respect to the straight-line L on which the contacts 40 are arranged. In this manner, the rolling surface 14 is set to an inclined surface, and thereby positioning of the moving body 20 in the width direction (lateral direction) and the thickness direction (vertical direction) of the track body 10 is possible using the small number of installed rotating bodies 30. That is, if the rotating body 30 is brought into contact with the inclined rolling surface 14, positioning in two directions including the vertical direction and the lateral direction can be performed.

Moreover, if a cylindrical rotating body 30 is brought into contact with the inclined rolling surface 14, an inner and outer circumferential difference occurs due to the line contact. For this reason, in the present embodiment, the circumferential surface 31a of the rotating body 30 which is in contact with the inclined surface is formed in a circular arc shape, and they are brought into contact at a single point.

Moreover, in the present embodiment, as shown in FIG. 4, the plurality of rotating bodies 30 are provided in two rows at intervals in the front and back direction of the moving body 20 along the longitudinal direction of the track body 10. According to this configuration, a running stability of the moving body 20 can be enhanced. Note that, when the track body 10 is made of only the linear portion 11, the rotating body 30 may have three rows or four rows.

As described above, according to the present embodiment described above, in the motion guiding device 1 having the track body 10 and the moving body 20 provided to be movable along the track body 10, the track body 10 includes the groove 13 formed along the longitudinal direction of the track body 10 and the plurality of rolling surfaces 14 formed inside and outside the groove 13. The moving body 20 includes the plurality of rotating bodies 30 which roll on the plurality of rolling surfaces 14. The respective contacts 40 in which the plurality of rotating bodies 30 are in contact with the plurality of rolling surfaces 14 are disposed on the same straight-line L in a cross-section orthogonal to the longitudinal direction of the track body 10. By adopting the configuration described above, even when the track body 10 includes the curve portion 12, it is possible to achieve a smooth operation and a decreased running sound of the moving body 20 with a simple configuration.

Second Embodiment

Next, a second embodiment of the present invention will be described. In the following description, the same reference numerals are given to constituents the same as or equivalent to those in the embodiment described above, and the descriptions thereof will be simplified or omitted.

Figure 7:
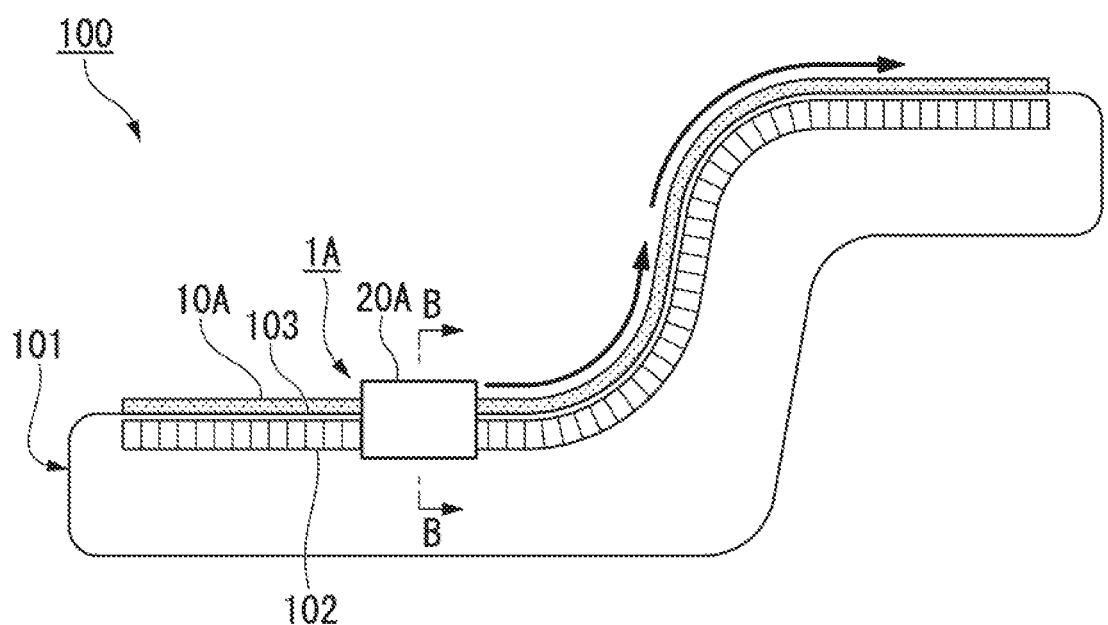
FIG. 7 is a side view which shows a transport device in a second embodiment of the present invention.
Figure 8:
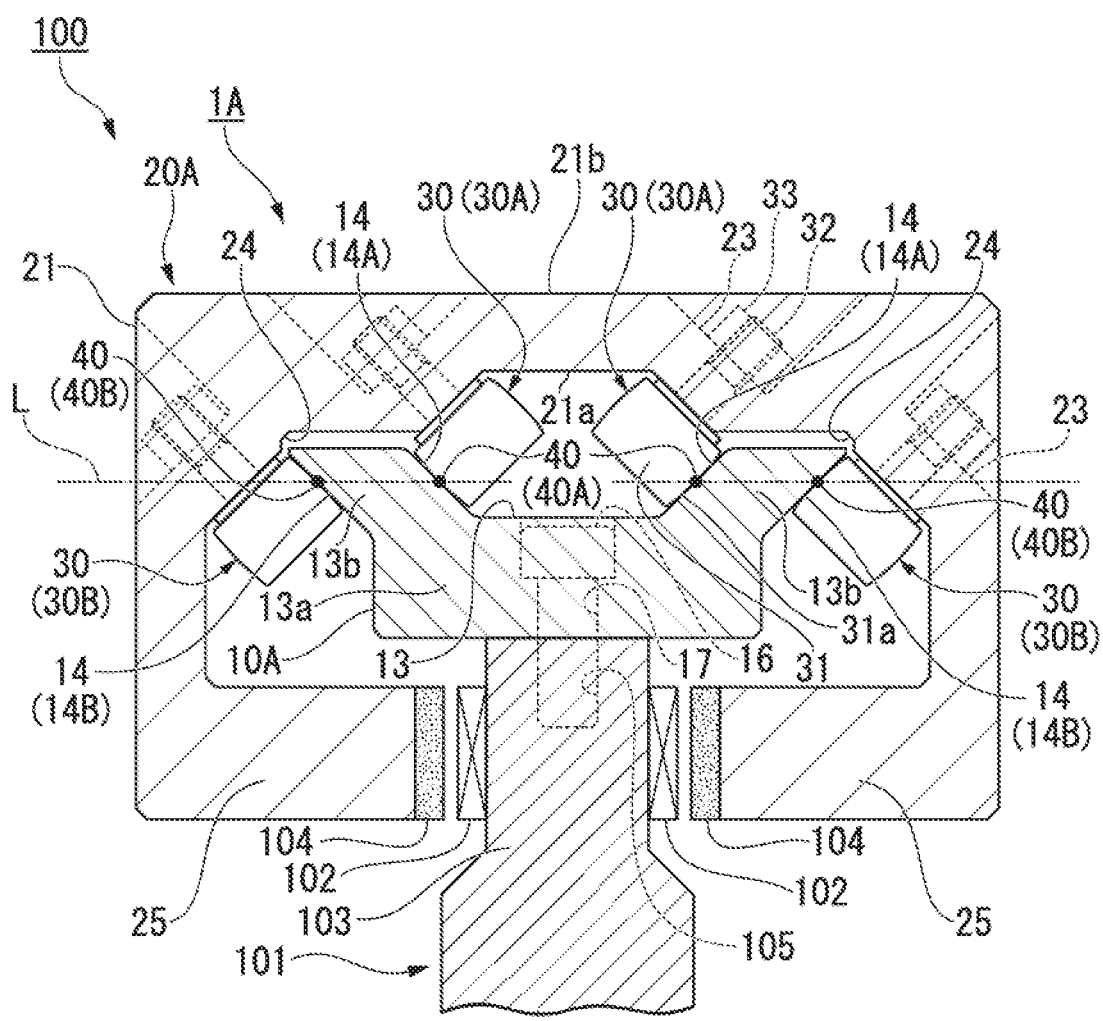
FIG. 8 is a cross-sectional view taken along arrow B-B in FIG. 7.

FIG. 7 is a side view which shows a transport device 100 in a second embodiment of the present invention. FIG. 8 is a cross-sectional view taken along arrow B-B in FIG. 7.

As shown in FIG. 7, the transport device 100 includes a motion guiding device 1A and a drive device 101. The motion guiding device 1A has a track body 10A, and a moving body 20A provided to be movable along the track body 10A. The drive device 101 causes the moving body 20 to move along the track body 10.

The drive device 101 is a linear motor device including a main body 103 in which a plurality of coils 102 are provided, and a magnet 104 (refer to FIG. 8) provided in the moving body 20. The coils 102 are provided on both side surfaces of the main body 103, and disposed along the track body 10A as shown in FIG. 7. Note that a shape of the track body 10A is not limited to this shape, and may be, for example, a track-like (an oval shape). In addition, the coils 102 may also be configured to be disposed in a track shape inside the track body 10A.

As shown in FIG. 8, the magnet 104 is attached to the moving block 21, and faces the coils 102. The moving block 21 is attached to a tip of the magnet mounting portion 25 extending toward the main body 103. Note that the magnet mounting portion 25 may be formed integrally with the moving block 21, and may also be configured to be attached to the moving block 21 as a separate part.

A fixing hole 105 for fixing the track body 10A is formed in the main body 103. The track body 10A of the second embodiment is formed to be thicker than the track body 10 of the first embodiment shown in FIG. 3. An insertion hole 17 into which a bolt 16 is inserted is formed in the bottom portion 13a of this track body 10A. The bolt 16 is screwed into the fixing hole 105 through the insertion hole 17 to fix the track body 10A to the main body 103. Note that a counterbore is formed in the insertion hole 17, and a head portion of the bolt 16 is disposed below the lower base of the groove 13.

The drive device 101 with the configuration described above generates a magnetic field that causes a current to flow through the plurality of coils 102 and generates thrust in the moving body 20. The moving body 20 moves along the track body 10A due to an attractive force or a repulsive force occurring between the coils 102 and the magnet 104 due to the magnetic field. In the second embodiment, as shown in FIG. 8, the respective contacts 40 in which the plurality of rotating bodies 30 are in contact with the plurality of rolling surfaces 14 are disposed on the same straight-line L in a cross-section orthogonal to the longitudinal direction of the track body 10, and thus it is possible to achieve a smooth operation with a decreased running sound of the moving body 20 in the same manner as in the embodiment described above.

As described above, while preferred embodiments of the present invention have been described with reference to drawings, the present invention is not limited to the embodiments described above. The shapes, combinations, and the like of constituent members shown in the embodiments described above are merely examples, and various modifications can be made based on design requirements or the like within a range not departing from the gist of the present invention.

Figure 9:
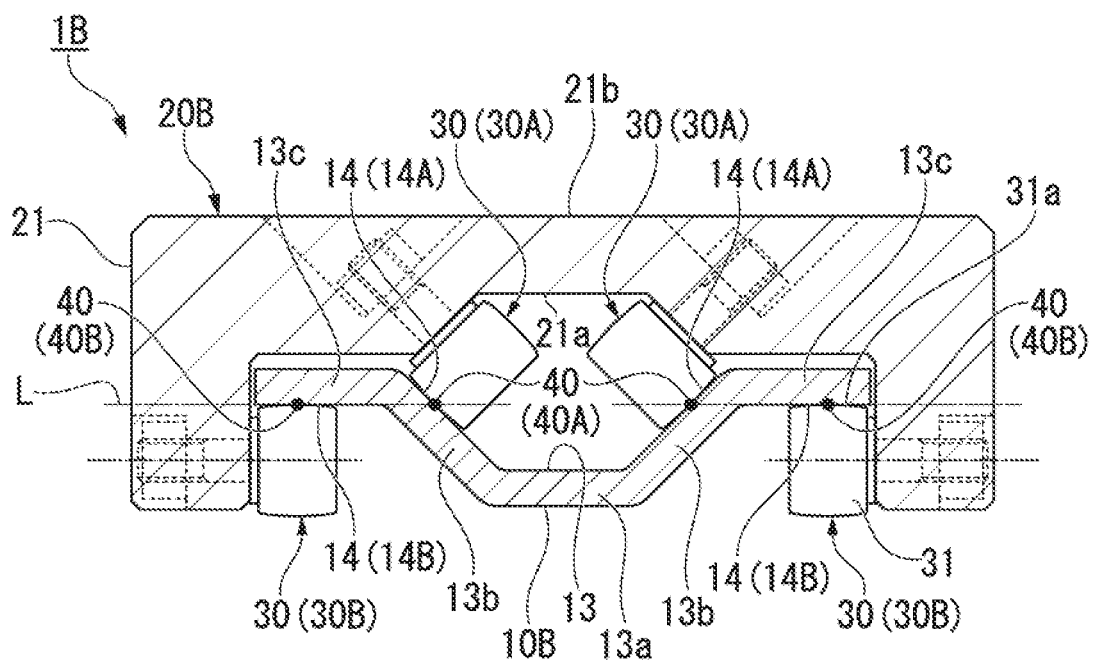
FIG. 9 is a cross-sectional view which shows a motion guiding device in another embodiment of the present invention.
Figure 10:
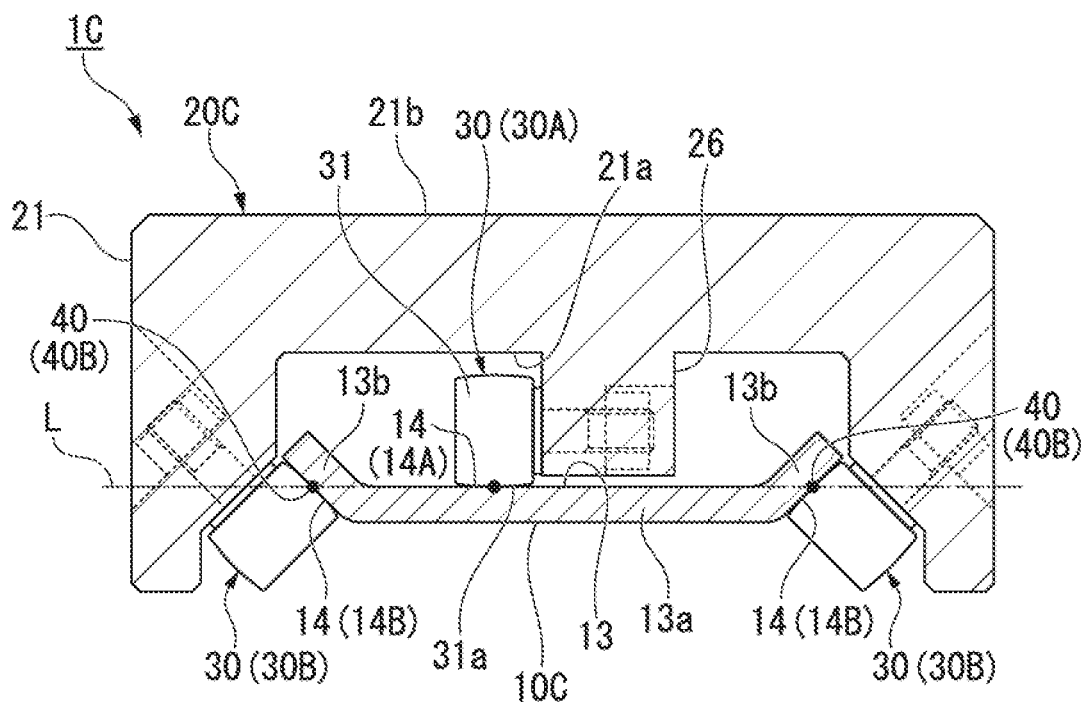
FIG. 10 is a cross-sectional view which shows a motion guiding device in another embodiment of the present invention.

For example, the present invention can adopt another embodiment as shown in FIGS. 9 and 10.

FIG. 9 is a cross-sectional view which shows a motion guiding device 1B in another embodiment of the present invention.

In the motion guiding device 1B shown in FIG. 9, the outer rolling surface 14B formed outside the groove 13 is a plane along the straight-line L. The track body 10B has a pair of flange portions 13c extending from the tip of the pair of side-wall portions 13b to both sides in the width direction. The outer rolling surface 14B is formed on a lower surface of each of the pair of flange portions 13c. The moving body 20B supports the second rotating body 30B that rolls on the outer rolling surface 14B in a horizontal direction. Even with this configuration, since the respective contacts 40 in which the plurality of rotating bodies 30 are in contact with the plurality of rolling surfaces 14 are disposed on the same straight-line L in a cross-section orthogonal to the longitudinal direction of the track body 10, it is possible to achieve a smooth operation with a decreased running sound of the moving body 20 in the same manner as in the embodiment described above.

FIG. 10 is a cross-sectional view which shows a motion guiding device 1C in another embodiment of the present invention.

In the motion guiding device 1C shown in FIG. 10, the inner rolling surface 14A formed inside the groove 13 is formed on the bottom portion 13a. This inner rolling surface 14A is a plane along the straight-line L. The moving body 20C supports the first rotating body 30A that rolls on the inner rolling surface 14A in the horizontal direction. The track body 10C has a total of three rolling surfaces 14; one inner rolling surface 14A and two outer rolling surfaces 14B. In addition, the moving body 20C has a total of three rotating bodies 30; one first rotating body 30A and two outer rolling surfaces 14B. Even with this configuration, since the respective contacts 40 in which the plurality of rotating bodies 30 are in contact with the plurality of rolling surfaces 14 are disposed on the same straight-line L in a cross-section orthogonal to the longitudinal direction of the track body 10, it is possible to achieve a smooth operation with a decreased running sound of the moving body 20 in the same manner as in the embodiment described above.

In addition, as shown in FIGS. 9 and 10, when the rolling surface 14 which is not an inclined surface is a plane along the straight-line L, the circumferential surface of the rotating body 30 in contact with the plane may have a cylindrical shape. It is because, even if the rotating body 30 is cylindrical when the rolling surface 14 is a plane, no inner and outer circumferential difference occurs. In addition, if the rotating body 30 has a cylindrical shape, it has more area in contact with the rolling surface 14 than the circular arc shape described above, and thus it is possible to enhance a running stability of the moving body 20.

INDUSTRIAL APPLICABILITY

According to the motion guiding device and the transport device described above, even if a track body includes a curve portion, it is possible to achieve a smooth operation and a decreased running sound of a moving body with a simple configuration.

REFERENCE SIGNS LIST 1, 1A 1B, 1C Motion guiding device
10, 10A, 10B, 10C Track body
11 Linear portion
12 Curve portion
12B Second curve portion
13 Groove
14 Rolling surface
20 Moving body
30 Rotating body
31a Circumferential surface
40 Contact
100 Transport device
101 Drive device
L Straight-line

The invention claimed is:

1. A motion guiding device comprising:
a track body; and
a moving body provided to be movable along the track body, wherein
the track body includes a groove formed along a longitudinal direction of the track body and a plurality of rolling surfaces formed inside and outside the groove,
the moving body has a plurality of rotating bodies that roll on the plurality of rolling surfaces, and
respective contact points in which the plurality of rotating bodies are in contact with the plurality of rolling surfaces are disposed on the same straight-line in a cross-section orthogonal to the longitudinal direction of the track body, and
wherein each of the respective contact points is a center point of a circumferential surface of each of the plurality of rotating bodies.

2. The motion guiding device according to claim 1, wherein
at least one of the plurality of rolling surfaces is an inclined surface inclined with respect to the straight-line on which the contacts are arranged, and
the circumferential surface of the rotating body in contact with the inclined surface is formed in a circular arc shape.

3. The motion guiding device according to claim 2, wherein a remaining portion of the plurality of rolling surfaces other than the inclined surface is a plane along the straight-line in which the contacts are arranged.

4. The motion guiding device according to claim 1, wherein the plurality of rotating bodies are provided in plural rows at intervals in a front and back direction of the moving body along the longitudinal direction of the track body.

5. The motion guiding device according to claim 1, wherein the track body has a curve portion curved in a direction orthogonal to the straight-line on which the contacts are arranged.

6. A transport device comprising a motion guiding device having a track body, a moving body provided to be movable along the track body and a drive device causing the moving body to move along the track body, the transport device comprising:
the motion guiding device described in claim 1 as the motion guiding device.

* * * * *